Figure 1:
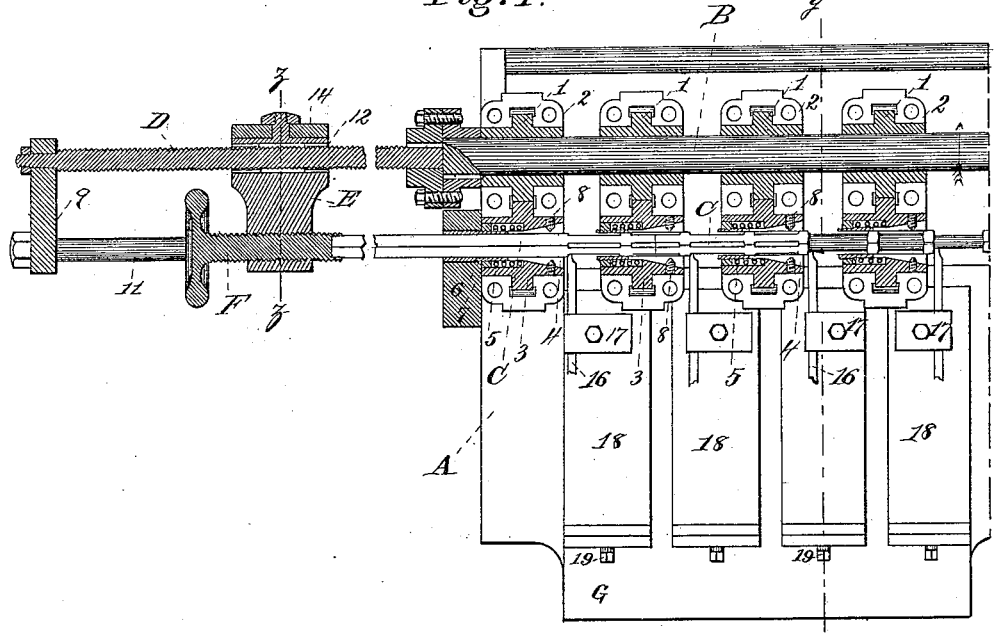
Figure 1A:
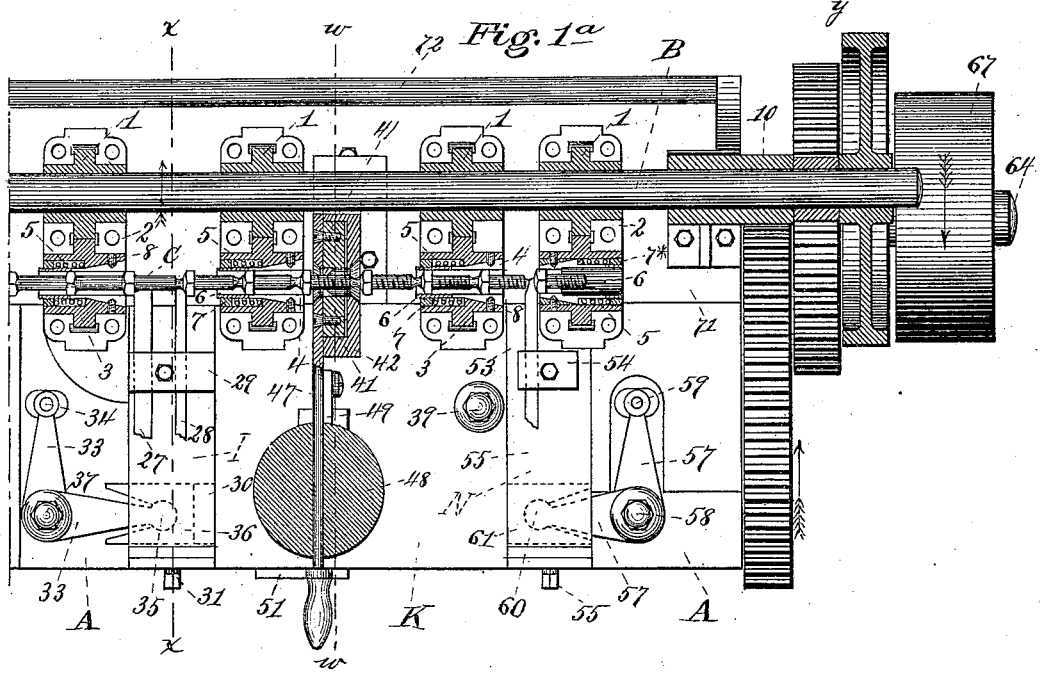

(No Model.)  3 Sheets—Sheet 1.

A. JOHNSTON.
SCREW MACHINE.

No. 337,499.  Patented Mar. 9, 1886.

Witnesses
W. A. Schoenborn.
Wm. Rheem.

Inventor
Allen Johnston
by A. Pollok
his attorney.

N. PETERS, Photo-Lithographer, Washington, D. C.

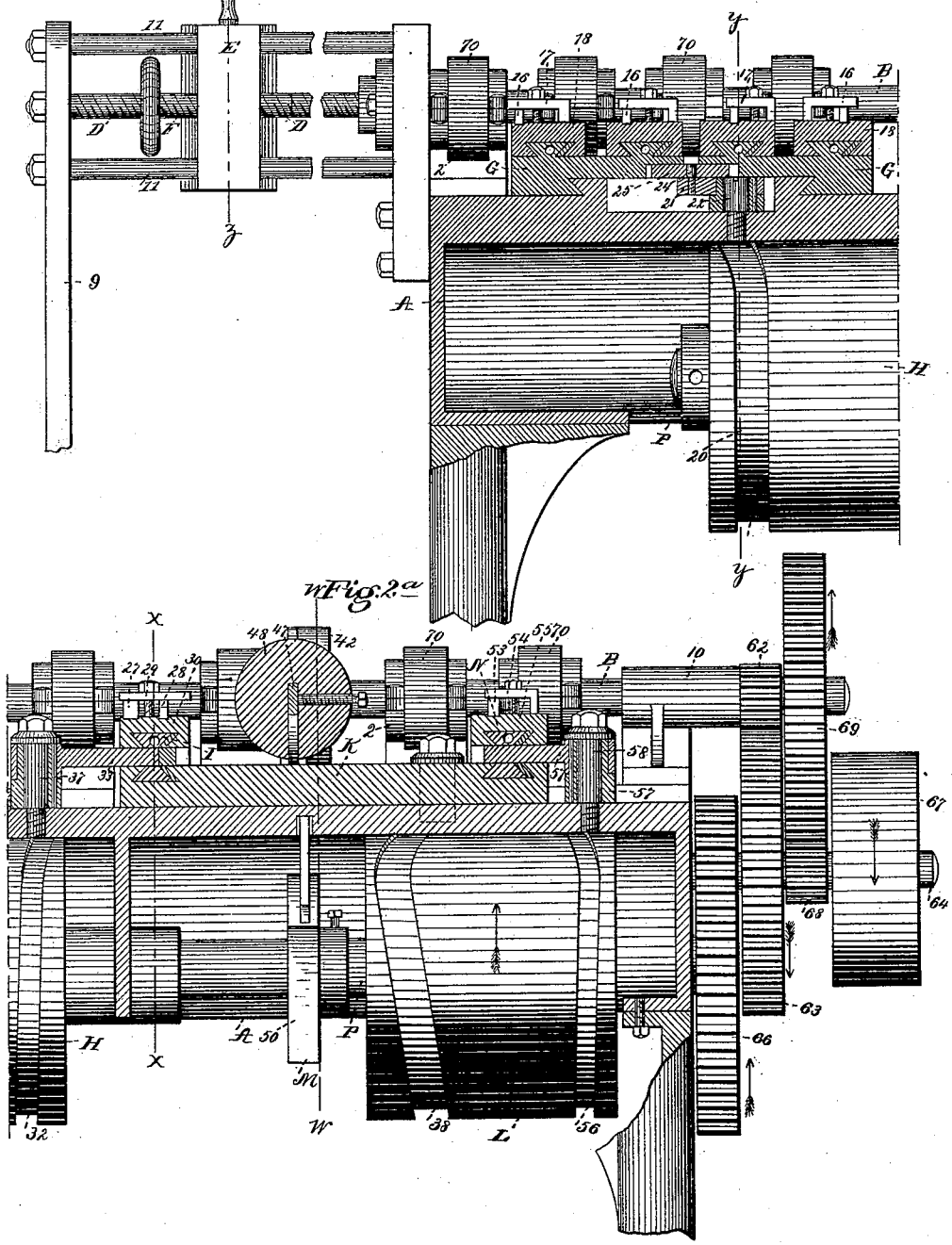

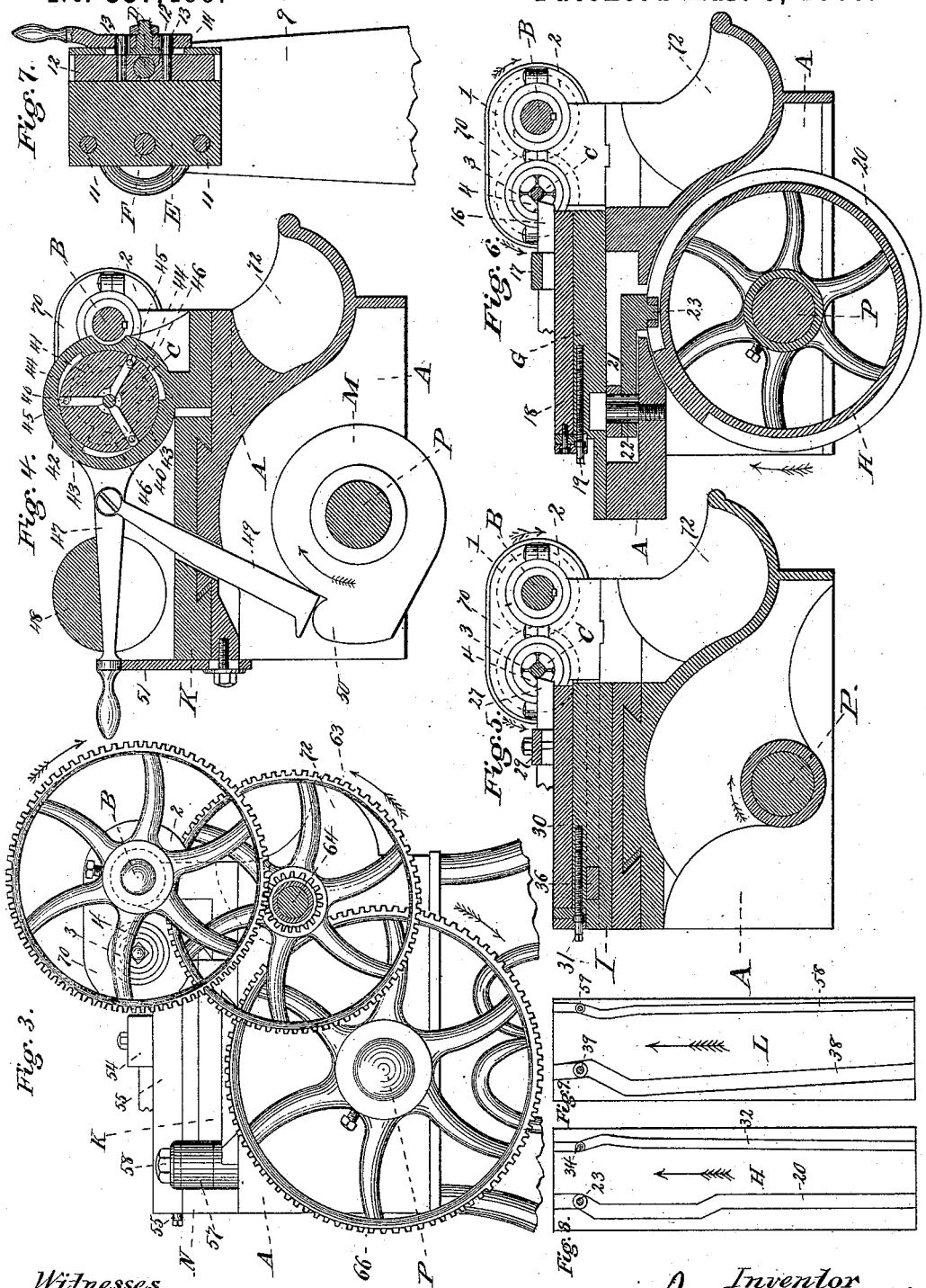

UNITED STATES PATENT OFFICE.

ALLEN JOHNSTON, OF OTTUMWA, IOWA.

SCREW-MACHINE.

SPECIFICATION forming part of Letters Patent No. 337,499, dated March 9, 1886.

Application filed December 29, 1885. Serial No. 187,047. (No model.)

*To all whom it may concern:*

Be it known that I, ALLEN JOHNSTON, a resident of Ottumwa, in the county of Wapello and State of Iowa, have invented a new and useful Improvement in Machines for Making Screws, which improvement is fully set forth in the following specification.

This invention relates more particularly to that class of machines by which a long rod or screw-stock is formed into a number of screws, although it is applicable, at least in part, to machines for making other articles.

Heretofore it has been customary to turn down the end of a rod or screw-stock for a suitable length to the diameter desired for the screw-shank, then to thread the shank thus formed, and finally to sever the rod, leaving a portion of the original size of the stock attached to the shank for the head of the screw.

In Letters Patent No. 299,477, granted me May 27, 1884, a machine is shown in which the shank of a succeeding screw is turned down while the turned-down portion at the end of the rod is being threaded and while the cutting-off tool is severing the rod or screw-stock behind the screw at the end of the rod.

Machines constructed in accordance with the present invention have an operation so far similar to the machine described in said patent that tools operate or may operate simultaneously at more than one part of the rod or screw-stock; but they possess, also, important points of difference, as hereinafter explained.

First. Instead of having one tool act upon the end of the rod or stock and others upon the part which forms the succeeding screw, a series of two or more tools are arranged to act upon the rod or stock at different points removed one or more screw's length from the end. This series may be composed of unlike tools—as, for example, one or more turning-down and one or more threading tools; or it may consist of like tools—as, for example, two or more turning-down or shaping tools. The severing or cutting-off tool is placed beyond the series of forming-tools, so that the screw is complete, all but severing, before it reaches the cutting-off tool, and the latter can be brought into operation at the same time with the other tools, and may finish its operation before the other tools.

Second. Instead of using a single chuck and having the series of tools to act upon the portion of the rod or screw-stock which projects beyond the chuck, two or more chucks are employed, so that the rod or screw-stock is supported adjacent to each tool, or adjacent to such tools, as may be desired, or on opposite sides of one or more tools, which therefore act upon the rod or stock between the chucks; also, a chuck is arranged to support and apply power to the rod between tools.

Third. For threading the rod or stock at a suitable distance from the end, instead of at the end itself, a tool is used to groove the rod or screw-stock, the cutters or chasers of the die are drawn inward so as to enter said groove, and the die is then made by a movement lengthwise of the rod or screw-stock to cut the thread for the desired distance. The cutters or chasers are then withdrawn a sufficient distance for the head of the screw to pass.

Fourth. For reducing or turning down the rod or stock to form the shank of each screw, a series of tools are employed, each successive tool reducing the part turned down by the preceding one, and each tool operating, first, by a movement inward toward the rod or screw-stock to bring it into action, then lengthwise of the same to turn down the rod for the desired distance, then outward to remove it from action and allow it to be brought into position for turning down another screw-shank.

Fifth. It is evident that the movements lengthwise of the rod or screw-stock can be given by movements of the cutting-tools over the rod, or by the movements of the rod past the tools. Both movements have heretofore been used in screw-machines, and parts of the invention can be carried into effect with either. Heretofore, however, the longitudinal movements have been intermittent. To give a specific illustration: if the rod is fed forward against, say, a turning-down tool, its forward motion is arrested when a suitable distance is turned down, in order to allow other operations to take place. An important feature of the present invention is the continuous feeding of the rod or screw-stock. The tools which act upon a considerable length of the rod by a movement lengthwise of the same—such as the turning-down and threading tools—may therefore have simply a transverse movement on the machine-frame, the longitudinal movement in cutting, as well as the ordinary advance of the rod or screw-stock, being effected by the continuous feed-motion of the rod. The cutting-off tool when in action is given a longitudinal motion at the same speed as the rod or screw, so as to cut square across the same.

Sixth. A new feed mechanism for advancing the rod or screw-stock by the revolution of a leading-screw has been devised and forms part of the invention. The invention further comprises certain other particular constructions, combinations, and arrangements, as hereinafter set forth.

The following is a description of what is considered the best mode of applying the principle of the invention, reference being had to the accompanying drawings, which form a part of this specification.

Figures 1 and 1ª together constitute a sectional plan of a screw-machine constructed in accordance with the invention; Figs. 2 and 2ª, a longitudinal sectional elevation of the same; Fig. 3, an elevation, partly in section, of the right end of the machine, as seen in Figs. 1ª and 2ª; Fig. 4, a cross-section, substantially on line $w$ $w$, Figs. 1ª and 2ª, in elevation, looking to the left; Figs. 5, 6, and 7, similar views on lines $x$ $x$, $y$ $y$, and $z$ $z$, respectively; and Figs. 8 and 9, developments on a plane surface of the grooved peripheries of two cam-drums, forming part of the machine.

The frame A supports the different rotatory and reciprocatory parts. The chuck-shaft B carries a number of spur-gears, 1, which are journaled each in a casting, 2, on the top of the frame A, and serve to support the chuck-shaft, as well as to receive motion from it. At 10 the chuck-shaft is journaled in a box on the machine-frame. Each gear 1 meshes with a corresponding gear formed in one piece with the head 3 of a chuck, which chuck-head is journaled in the same casting, 2, as the gear which drives it. Each casting 2 has a cap, 70, which forms a housing to the gear 1 and chuck-head 3. In each chuck-head are a series of spring-chuck jaws, 4, formed by slitting a tubular turning of suitable shape at one end for a portion of its length. The outer surfaces of the jaws are inclined, and the inner surface of the chuck-head is correspondingly inclined, so that by moving the chuck-jaws endwise they will be drawn together or allowed to separate according to the direction of motion.

A spiral compression-spring, 5, surrounds the ring 6, to which the chuck-jaws are attached, and is interposed between a shoulder on the inside of the chuck-head and the nut 7 on said ring, so that its tendency is to draw the chuck-jaws to the left and cause them to press upon the rod or screw-stock C. Screws 8 prevent the jaws from turning in the head of the chuck. The last chuck shown at the right of Fig. 1ª is reversed. The spiral compression-spring 5 is held between shoulders on the chuck-jaws and in the hollow screw 7*, tapped into the chuck-head. The chucks serve to communicate power to the rod or stock, as well as to support the same at intervals and to guide it. As shown, the opening through the chuck is square, (see Figs. 3, 5, and 6,) so as to fit the rod or screw-stock, which, as shown, is square in cross-section. The rod or screw-stock C is moved through the series of chucks at a uniform speed by means of the leading-screw D. This screw is fastened on the end of the chuck-shaft, so that their axes coincide, and the outer end is journaled in the standard 9. This standard is braced by the tie-rods 11, upon which the carriage E slides. This carriage is provided with a divided nut, 12, each part of which is held in guides on said carriage, and is provided with a pin, 13, projecting into a cam-slot in the pivoted disk 14, so that by turning said disk the two parts of the nut can be moved into and out of engagement with the leading-screw.

The carriage E is provided with an adjusting-screw, F, which is turned back for inserting a new rod or screw-stock, and turned forward in order to press the front of the new rod against the rear of the one already in the machine. The outer end of the rod or screw-stock turns within a cylindrical recess in the end of the adjusting-screw.

The rod or screw-stock is reduced to the proper diameter by the four turning-down tools, 16, each held in a clamp, 17, on a carrier, 18, connected by a tongue and groove with the slide G, so that it can be adjusted thereon by means of the screw 19, tapped into the tongue on the slide G. The slide G is mounted in ways of the frame A. It is reciprocated across the frame by means of the cam-groove 20, in the periphery of drum H, and the bent lever 21. This lever is fulcrumed on the stud 22, screwed fast in frame A. The longer arm has a projection, 23, provided with a roller, which fits within the cam-groove 20. The other or shorter arm is connected by the screw-journal pin 24 with the block 25, fitting and sliding within an elongated recess in the bottom of the slide G. The slide G is moved inward, so that the turning-down tools 16 come into contact with the rod or screw-stock at the end of what is to be a screw. The slide and turning-down tools are then held stationary while the rod or stock is fed past them the required distance, whereupon the slide and the tools are withdrawn and held away until the feed of the rod has brought the end of what is to be a succeeding screw opposite each tool. The successive actions of the tools on each portion of the rod reduce it to the required diameter, leaving a sloping shoulder at each end of the reduced portion, as shown.

The rod or stock is next acted on by the two turning-tools 27 and 28, the former serving to square the shoulder on the under side of the head and the latter to turn a groove between the point of one screw and the head of the next. If a sloping shoulder should be preferred the former tool would be omitted.

Both tools are held in a clamp, 29, on a carrier, 30, connected by tongue and groove with the cross-slide I, and adjustable by means of the screw 31. The cross-slide I is mounted in ways of the longitudinal slide K, which latter is mounted in ways of the machine-frame. The slide I is moved crosswise of the frame by the cam-groove 32 in drum H, and the bent lever 33, fulcrumed on the stud 37, tapped into the machine-frame. A pin, 34, in the end of the longer lever-arm passes through a slot in the frame A, and is acted upon by the walls of cam-groove 32. The other lever-arm is shaped as shown in dotted lines, Fig. 1, the dish-shaped head 35 fitting in a circular hole in the block 36, which is held in a groove in the slide I. The vibration of the lever moves the slide I crosswise of the frame, but does not interfere with the movement parallel with the rod or screw-stock, because the block 36 can slide in the groove in which it is placed. The slide K, and with it, of course, the slide I, mounted thereon, is moved longitudinally by the walls of cam-groove 38 acting upon the pin 39, which is fastened in the slide K, and passing through a slot in the machine-frame enters said groove.

The cam-groove 38 is formed in the periphery of drum L. The groove is so shaped that the slide K is moved to the right at the same speed that the rod or stock is fed by the leading-screw D, so that the tools 27 and 28 have no longitudinal but only a transverse movement relatively to the rod or screw-stock.

The tools are moved inward when the proper parts of the rod or stock come opposite them, and at the same time they are moved longitudinally of the machine. When they have finished their action, they are withdrawn, the movement of the slide K is reversed, and they are returned to act again upon a succeeding portion of the rod.

The next operation in the formation of the screw is to thread the shank. The die for this purpose is composed of three cutters or chasers, 40, (sharpened at their inner ends,) which slide radially, or nearly so, in the annular disk-holder 41. This holder fits within a casing, 42, fastened by a bracket to the machine-frame. The inner periphery of the casing is concentric at the points 43, to form a bearing for the holder, and is eccentric at the points 44, to form inclines, whereby the die cutters or chasers are pressed inward when the holder is turned to the left, as shown in Fig. 4.

At the inner edge of each cutter is a projection or pin, 45, which overlies an incline, 46, on the back of the casing, as shown in dotted lines in Fig. 4. When the holder is turned to the right, the projection or pin rides over the incline and moves the cutter outward. The rotation of the holder is controlled by the cam M, through the lever-arm 47, the weight 48, and the link 49. The lever arm 47 is fastened by screws on the face of the holder, and the weight 48 is adjustably secured on said arm. The link 49 passes through a hole in the slide K, and also through a guiding-slot in the frame A. While the die is cutting the thread the weight holds down the lever-arm, keeping the cutters or chasers in contact with the rod or screw-stock. When the thread has been cut the desired distance, the projection 50 strikes the end of the link 49, lifts the lever-arm 47, and turns the holder so as to open the die. This projection 50 holds up the weight until the head of the screw has passed the cutters. It then allows the weight to fall and draw the cutters inward, the points of the cutters entering the groove which has been turned by the tool 28. The further advance of the rod or screw-stock causes the cutting of a new screw-thread to begin. An adjustable stop, 51, fastened to the machine-frame A by the set-screw 52, supports the weight 48 and determines the depth of the cut or the diameter of the opening between the cutting-edges of the die.

After the thread has been cut it only remains to sever the newly-formed screw and to give the proper shape to the head of one screw and the point of the succeeding screw. This is done by the cutting-off tool 53, held in the clamp 54 on the carrier 55, mounted on the cross-slide N, and adjustable by means of the screw 55. The cross-slide N is mounted in ways of the longitudinal slide K, and is moved transversely thereon by means of the cam-groove 56 in the periphery of drum L and the lever 57, fulcrumed on the stud 58 on the machine-frame. The longer arm of the lever is provided with a pin 59, which is engaged by the cam-groove 56, and the shorter arm is connected with the cross-slide N by the circular head 60 and the block 61, which receives said head, and slides in a groove in the cross-slide.

When the cutting-off tool is moved inward, it is carried with the slide K at the same speed as the rod or screw-stock, so that its movement with respect to the latter is simply across the same. It acts simultaneously with the tools 27 and 28, and could of course be carried by the same slide, although it is preferred for mechanical reasons to use two slides, as shown. It will be observed that the last chuck of the series is reversed, so as to hold the screw in close proximity to the cutting-off tool.

The drums H L and cam M are fixed on the cam-shaft P, which receives motion from the chuck-shaft B through a train of spur-gears, which reduces the speed in transmission. A pinion, 62, fast on the chuck-shaft engages the large wheel 63, loose on the fixed stud 64, and a pinion (not shown) on the hub of the large wheel 63 engages the large wheel 66, fast on the cam-shaft. Motion is communicated to the chuck-shaft from the belt-pulley 67, which runs loosely on the stud 64, through the pinion 68, fastened to said pulley, and the large gear 69, fast on the chuck-shaft. The object of this is to secure a greater steadiness of motion.

The operation of the machine is as follows:

A rod or screw-stock having been placed with one end in the chuck at the left end of the machine and the other in the cup end of the adjusting-screw F, and the latter having been turned forward, so as to take up any slack between the old and new rods after the nut 12 has been closed on the leading-screw D, and the several tools properly set or adjusted, the machine is started. The carriage E, which at this time is near the left end of the leading-screw D, is drawn forward by the rotation of said screw and pushes the rod or screw-stock through the series of chucks and past the various tools, while the rod or stock at the same time is revolved continuously. The chuck-jaws expand and contract, as required, by any slight variations in the diameter of different parts of the rod or screw-stock. This rod may be considered as divided into certain lengths, from each of which a screw is to be formed. Each such screw's length has the portion for the shank turned down or reduced in diameter to a certain extent by the first turning-down tool, then to a greater extent by the successive turning-down tools, until the last or fourth tool gives it the diameter which the shank is to have. The turning-down tools 16 operate by motions, first, transverse to the rod to bring them into action, then lengthwise of the same to turn it down for the desired distance, and, lastly, transverse again to put them out of action, the transverse motion being a reciprocation given to the slide G by the cam 20 through lever 21, the lengthwise movement being the continuous feed of the rod or screw-stock. Each screw's length is then subjected to the action of tools 27 and 28, the former of which turns a squared shoulder at the inner end of the screw-shank. The latter turns a groove at the point of the same for facilitating the threading operation. The tools 27 and 28 act solely by transverse motions imparted by the cam 32 through the lever 33, the longitudinal feed of the rod or screw-stock being compensated for by the reciprocation of the slide K, by means of the cam 38. Each shank is then threaded by the cutters 40. These cutters, which have been held away from the rod by the inclines 46, in order to allow the head of the preceding screw to pass, are drawn into the groove at the point of the screw by the action of the inclines 44, when the holder 41 is turned by the weight 48, drawing down the lever-arm 47, on the release of the link 49, by the projection 50 of cam M. As the rod or stock is fed forward, they cut the thread thereon. The pitch of the thread is determined by the rapidity of the feed movement. To change the pitch it is only necessary to change the leading-screw D, the nut 12, and the cutters 40, and pitch of cam 38. When the thread has been cut, the lever-arm is lifted by the cam M acting upon link 49, and turns the holder so that the cutters are drawn away from the rod or stock by the inclines 46, in order to allow the head of the screw to pass.

The completed screw is severed from the rod or screw-stock by the cutting-off tool 53 which, like the tools 27 and 28, has, with respect to the rod, transverse movements only.

The severed screws are pushed from the last chuck and drop on the incline 71, which conducts them into the trough 72, in which the turnings from the various tools also collect.

It is evident that little or no time is wasted in this machine, the turning-down tools not having to wait for the threading-tool, nor the latter for the former, nor either of them for the shaping and cutting-off tools.

By the use of a number of turning-down tools, the reducing operation is accomplished much quicker than with one alone, and can be performed on a long shank in the same time as the threading operation, even when the latter extends but a fraction of the length of the shank.

The chuck-jaws shown are adapted for a square rod; but it is evident that these and also the style of chuck can be modified to suit various shapes and sizes of rod.

The machine is principally designed to make long screws or bolts, and it is for this reason that the turning-down tools have been given in effect a movement lengthwise of the rod or screw-stock. The machinery shown in my patent above referred to is more particularly designed for making short screws.

Modifications can be made in details without departing from the spirit of the invention, and parts of the invention can be used separately. For example, so long as one or more of the essential principles set out in the first part of this specification, or the substance of one or more of the combinations hereinafter set forth is or are employed, it is immaterial how much the machine is otherwise varied, it not being intended to limit the invention, say, to a special chuck or special feed mechanism, or a particular mode of or mechanism for bringing the tools into action, or to particular forms of tools, except where such particular arrangements may be necessary in order to accomplish the objects of a claim, or where the same are definitely pointed out as essential thereto.

The term "screw's length," as herein employed, is designed to include generally the length of the articles made. It is evident that the invention, at least in part, could be used in hand-machines as well as those in which the operations are entirely automatic.

Having now explained the principle of the invention and the manner in which the same may be applied industrially, what I claim, and desire to secure by Letters Patent, is—

1. In combination with the chuck or chucks for revolving a long rod or screw-stock and a cutting-off tool for severing the articles formed therefrom, a series of two or more tools placed one or more screw's length apart inside the cutting-off tool, so that two or more tools of said series may act successively upon each article and simultaneously upon two or more of the articles between the cutting-off tool and the rear end of the rod or stock, substantially as described.

2. In combination with the chuck or chucks and a cutting-off tool, a series of tools for turning down and threading successive portions of a long rod or stock, said tools being placed inside the cutting-off tool, so that the successive lengths of the rod or stock are turned down and threaded before reaching the cutting-off tool, substantially as described.

3. The combination, with a series of tools and feed mechanism for advancing the rod or stock to be operated upon by said tools, of a chuck or chucks placed between the tools for communicating power to the rod or stock between the tools, substantially as described.

4. The combination of a series of chucks arranged in line, feed mechanism, and a series of tools, substantially as described.

5. The combination of a series of chucks arranged in line, the feed mechanism, and the turning-down, threading, and cutting-off tools, substantially as described.

6. The combination, with a chuck or chucks for holding and revolving a rod or screw-stock, of a tool for cutting a groove in said rod or stock and cutters or chasers for threading said rod or stock beginning with said groove, substantially as described.

7. The combination, with a chuck or chucks and a series of turning-down tools placed one or more screw's lengths apart, of operating mechanism for feeding the rod or screw and for moving said tools, said mechanism bringing the tools into and out of action by transverse motions and causing them to reduce the rod or stock for the desired distance by a lengthwise movement, and to advance the rod or stock, so that the same portion may be acted upon successively by said tools, substantially as described.

8. The combination, with a chuck or chucks, a tool, such as a turning-down or a threading tool, for cutting by a movement lengthwise of the rod, and a cutting-off tool, of feed mechanism for advancing the rod continuously, so that it is fed against the first-named tool when the latter is in action, as well as advanced to bring a new portion of the rod in position to be acted upon, said cutting-off tool when in action being movable with said rod, substantially as described.

9. The combination, with a chuck or chucks, one or more turning-down tools, a threading-tool, and a cutting-off tool, of continuously-operating feed mechanism and means whereby the tools can be brought into and put out of action, substantially as described.

10. The combination, with a series of chucks and feed mechanism for advancing a rod or screw-stock continuously through said chucks, of a series of turning-down tools movable transversely, die cutters or chasers movable transversely, and a cutting-off tool movable both transversely and longitudinally, substantially as described.

11. The combination, with a chuck or chucks, of a rotatory leading-screw and a carriage engaging said screw for feeding the rod or screw-stock through the chuck or chucks, substantially as described.

12. The combination, with a chuck or chucks for rotating a rod or stock and one or more tools for acting upon the said rod or stock, of a feed mechanism comprising a rotating leading-screw and a carriage engaging the same for advancing the rod or stock, substantially as described.

13. A series of chucks arranged in line and comprising each a rotatory head, chuck-jaws in said head, and a spring tending to draw the jaws together, substantially as described.

14. The combination of the series of chucks, the parallel driving-shaft, the leading-screw, and the feed-carriage engaging said screw for advancing the rod or stock through said chucks, substantially as described.

15. The combination, with a series of chucks and a series of tools placed one or more screw's lengths apart and arranged between the chucks, of automatic mechanism for rotating the chucks for feeding the rod or screw-stock and for operating the tools, substantially as described.

16. The combination, with a chuck or chucks, of two or more turning-down tools and a threading-tool for operating successively upon the same portion of a rod or screw-stock and simultaneously upon three or more different portions, substantially as described.

17. The combination, with a chuck or chucks and continuously-operating feed mechanism, of a turning-down tool movable transversely to the axis of the chuck, and a shouldering-tool movable both transversely and longitudinally, substantially as described.

18. The combination, with a series of chucks and mechanism for feeding a rod or stock continuously, of a series of turning-down tools movable transversely and a shouldering-tool movable both transversely and longitudinally, substantially as described.

19. The combination, with a series of tools for acting successively upon the same portion of a rod or stock and simultaneously upon different portions, of mechanism for rotating the rod or stock and for supporting and guiding the same between the tools, substantially as described.

20. The herein-described improved machine for making screws from a long rod or screw-stock, the same comprising, in combination, the following elements: a frame, a chuck-shaft, a cam-shaft, connecting-gearing, a series of chucks arranged in line, a leading-screw, a feed-carriage, the series of turning-down tools, the shouldering and grooving tools, the threading-tool, the cutting-off tool, the cams, and the devices intermediate the cams and said tools, substantially as described.

21. The improved method or process of forming screws from a rod by the three following steps or operations: first, reducing the rod at proper intervals to form the shanks of the screw; second, threading the screws; third, continuously feeding the rod through the machine while said operations are being performed, substantially as described.

22. The improved art, method, or process of making screws from a rod, consisting of the following steps or operations: first, reducing the rod at proper places to form the shanks of the screws; second, threading the screws; third, cutting off the screws, said three steps being performed simultaneously, substantially as described.

23. The improved art, method, or process of making screws from a rod, consisting of the following steps or operations: first, reducing the rod at proper places to form the shank of the screw; second, squaring the screw-blank under the head; third, threading the screw; fourth, cutting off the screw, said operations being performed simultaneously, substantially as described.

In testimony whereof I have signed this specification in presence of two subscribing witnesses.

ALLEN JOHNSTON.

Witnesses:
J. T. HACKWORTH,
W. T. MAJOR.